Jan. 3, 1967 F. M. WOOD ET AL 3,295,362
METHOD OF AND APPARATUS FOR ULTRASONIC INSPECTION
UTILIZING CORRELATION TECHNIQUES
Filed July 15, 1963 3 Sheets-Sheet 1

INVENTORS
Fenton M. Wood &
Noel B. Proctor
BY
Arnold, Roylance & Harris
ATTORNEYS INVENTORS
Fenton M. Wood &
Noel B. Proctor
BY
Arnold, Roylance & Harris
ATTORNEYS

United States Patent Office 3,295,362
Patented Jan. 3, 1967

3,295,362
METHOD OF AND APPARATUS FOR ULTRASONIC INSPECTION UTILIZING CORRELATION TECHNIQUES
Fenton M. Wood, Sugarland, and Noel B. Proctor, Houston, Tex., assignors, by mesne assignments, to American Machine & Foundry Company, New York, N.Y., a corporation of New Jersey
Filed July 15, 1963, Ser. No. 294,969
13 Claims. (Cl. 73—67.9)

This invention relates to ultrasonic inspection systems in which the presence of a flaw or other anomaly is detected by means of the reflection therefrom of pulsed ultrasonic energy; and more particularly to such systems in which correlation techniques are used to provide increased discrimination between anomaly-reflected pulses and random noise.

In reflection-type flaw or anomaly detection systems, the strength of a reflected pulse depends upon a number of parameters. The flaw may be small, reflecting only a portion of the incident beam; and its dimensions may approach the wave length of the ultrasonic energy forming the beam, resulting in a wide spreading of reflected energy. Also, the path of transmitted and reflected pulses may be long and may involve considerable attenuation due to reflections from one or more surfaces. These or any of a number of other factors may result in weak reflected returns which require a correspondingly large degree of amplification in the receiving channel. The amplification necessary may be so great that noise of a random character, both atmospheric and circuit-generated, approaches or exceeds the amplitude of the reflected pulse representations. This random noise in the receiving channel may render flaw- or anomaly-reflected pulse indications ambiguous, or may even mask them completely.

It is accordingly an object of this invention to provide a method of and apparatus for pulse-type ultrasonic inspection which provide greatly increased discrimination between anomaly-reflected pulses and random noise.

It is another object of this invention to provide such a method and apparatus which are versatile and may be used with various configurations of flaw detecting systems.

It is a further object of this invention to provide such a method and apparatus which are relatively simple and require the use of a minimum of complex equipment.

The broad inventive method which results in realization of the above objectives comprises transmitting a series of periodic pulses of ultrasonic energy into a region and receiving such of those pulses as are reflected from a flaw or anomaly in the region. The series of received reflected pulses is converted into a representative signal, which signal also unavoidably contains random noise. Each reflected pulse represented in the signal is then correlated with a similar, time-aligned, pulse representation. Depending upon the particular inventive method employed, it may be correlated either with signal representations of one or more other reflected pulses, or with a signal representation of a transmitted pulse. In the correlation process, the time-aligned pulse representations are increased in amplitude and the noise, being of random character, is not so increased, and may even be diminished, with a resulting heightened distinction between pulse representations and noise.

A number of inventive systems are provided for practicing the inventive methods described herein. Basically, and broadly, the apparatus comprises a means for directing a periodic series of ultrasonic vibrational pulses into a region to be inspected, and for receiving such pulses reflected from an anomaly therein, either at a single receiving transducer or at a plurality of receiving transducers. Systems utilizing a single receiving transducer provide delay means to time-align successive received pulses and subsequent means to correlate the time-aligned pulses. Other systems utilizing a single receiving transducer provide means for coupling a sample of the transmitted pulse and aligning it in time with the received pulse, and then means for correlating the received pulse with the transmitted pulse. Systems using a plurality of receiving transducers are provided, having means for time-aligning signal representations of reflected portions of the same transmitted pulse which are received at all of the receiving transducers, with subsequent means to correlate the time-aligned received pulse representations. The manner in which the inventive method and apparatus fulfill the above and other objectives may be understood more clearly by reference to the following detailed description taken in conjunction with the drawings, which form a part of the specification, and in which:

Figure 5:
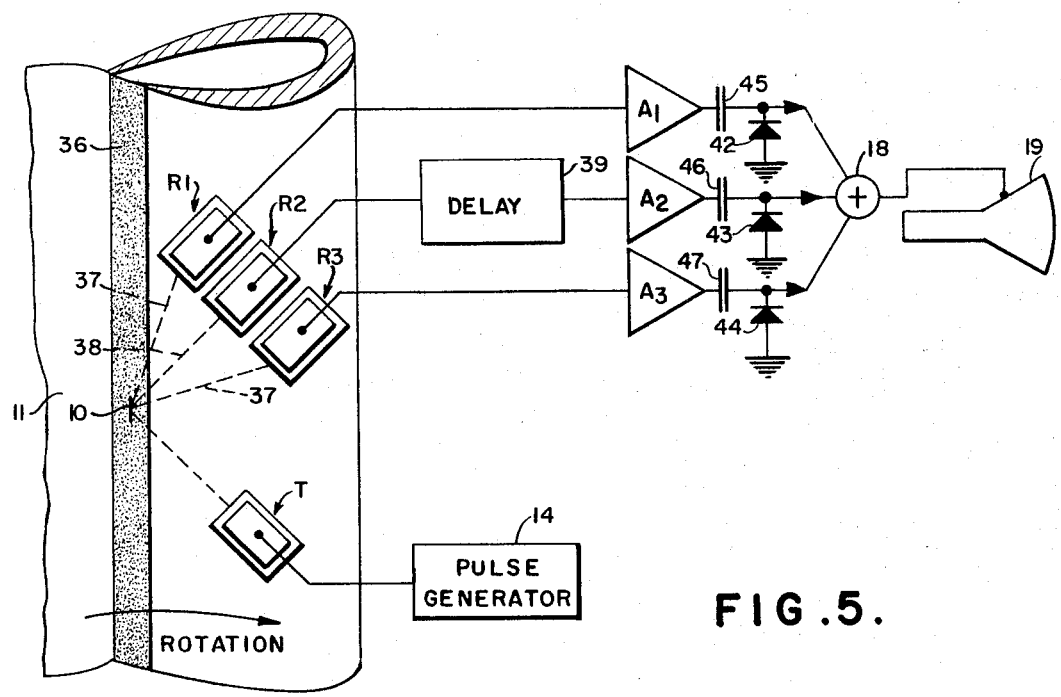
FIG. 5 shows, partially in block diagram and partially in plan view, an embodiment of this invention utilizing a separate transmitting transducer and a plurality of receiving transducers, and in which reflected pulses received at the plurality of receiving transducers are correlated.
Figure 6:
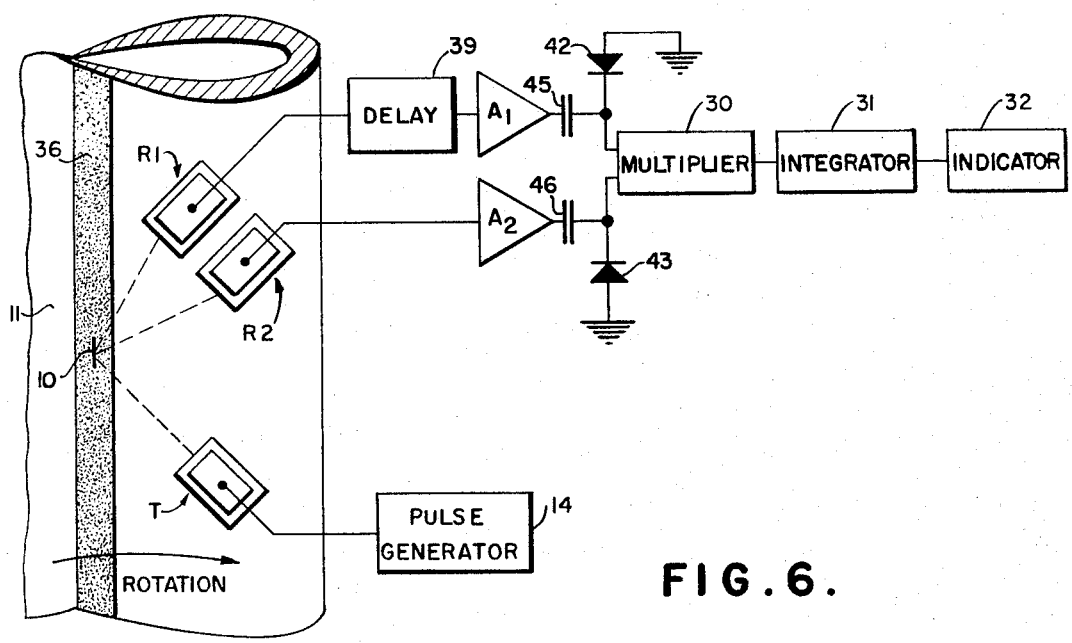
Figure 7:
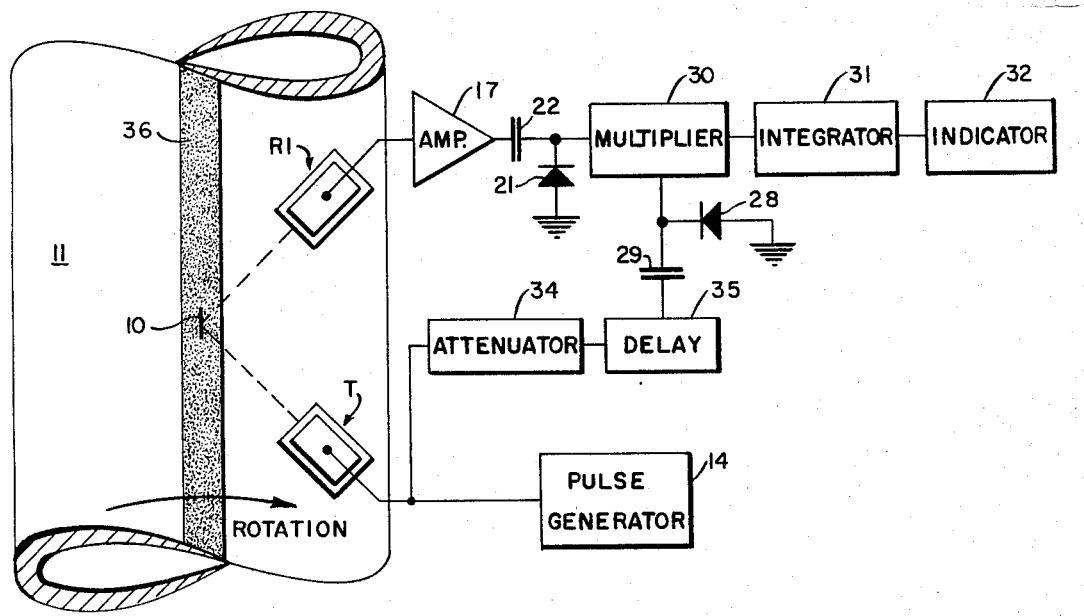

FIG. 6 shows, partially in block diagram and partially in plan view, a system similar to the embodiment of FIG. 5, but utilizing a different method of correlation; and FIG. 7 shows, partially in block diagram and partially in plan view, an embodiment somewhat similar to the embodiment shown in FIGS. 5 and 6, but using a single receiving transducer, and in which a received reflected pulse is correlated with a sample of the transmitted pulse.

Figure 1:
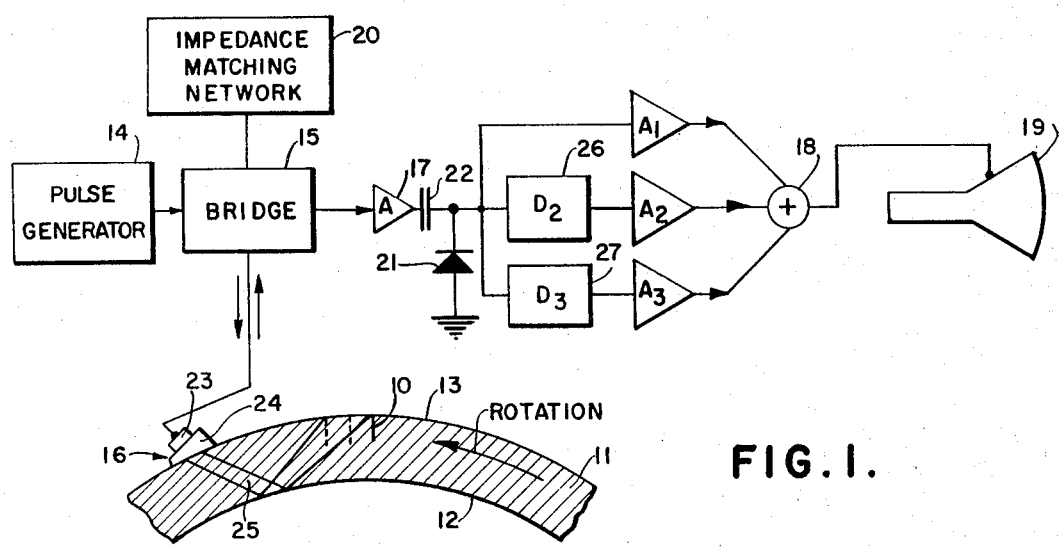
FIG. 1 shows, partly in block diagram and partly in sectional view, one embodiment of this invention in which a single transceiving transducer is used and in which successive reflected pulse representations are delayed and then correlated.

Turning now to FIG. 1, there is shown an ultrasonic insepction system for detecting a flaw 10 in a rotating pipe 11, having inner and outer coaxial cylindrical surfaces 12 and 13, respectively. Periodic pulses of electrical energy at an ultrasonic frequency are generated by pulse generator 14 and transmitted through hybrid bridge 15 to transceiving transducer 16 for conversion into mechanical vibrations and transmission into pipe 11. Flaw-reflected pulses received at transducer 16 are fed through bridge 15 into the receiving circuitry, comprising principally an amplifier 17, followed by three parallel channels, a summing circuit 18, and a cathode ray tube (CRT) indicator 19. Detection is accomplished by diode detector 21 connected with its anode to ground and with capacitor 22 providing D.C. isolation of its cathode from the output of amplifier 17.

Hybrid bridge 15 is a directional impedance circuit which permits electrical energy transmission from pulse generator 14 to transducer 16, but blocks direct transmission from pulse generator 14 to the input of amplifier 17 in the receiving circuitry. Return electrical signals from transducer 16 are fed through bridge 15 to the input of amplifier 17. Transducer 16 forms one arm of the bridge, and an impedance matching network 20, whose impedance exactly matches that of transducer 16, forms another arm. Such bridges use a three-winding hybrid coil and are commonly used in repeater amplifiers in two-way telephone communication systems. The bridge structure forms no part of this invention. These bridges are well known and widely described in the literature, as for instance in "Transmission Lines and Networks" by Walter C. Johnson, McGraw-Hill, 1950, at pages 214–216. Any other directional impedance type device may be used in lieu of the hybrid bridge to provide isolation between pulse generator 14 and the receiving circuitry.

Transducer 16 comprises a transducing element 23, which may conveniently be a quartz piezoelectric crystal, and a wedge 24 for angular coupling of ultrasonic energy between transducing element 23 and the outer cylindrical surface 13 of pipe 11. Ultrasonic electrical pulses from pulse generator 14 applied to transducing element 23 of transducer 16 are converted therein to mechanical vibrations and transmitted through wedge 24 and interface 13 into pipe 11. The use of such wedges in connection with transducing elements for coupling ultrasonic energy into and out of a surface at angles other than normal to the surface is well known and is discussed, for instance, in U.S. Patent 2,527,986 to Benson Carlin. Wedge 24 may be of any material suitable for coupling ultrasonic energy between the particular transducing element used and the particular metal of which pipe 11 is constructed.

Ultrasonic pulses generated in transducing element 23 and coupled through wedge 24 are refracted by outer pipe surface interface 13 and enter the interior of pipe 11 as a beam 25 which may be of either of the longitudinal or shear mode, depending upon the geometry of the wedge and interface. Beam 25 enters pipe 11 at an angle other than normal to outer surface 13, and is repeatedly reflected from inner surface 12 and outer surface 13 as it progresses circumferentially around the pipe. When it is incident upon a flaw or other anomaly, a portion of beam 25 is reflected therefrom and returns to transducer 16, where it is converted into a representative electrical signal by transducing element 23 and fed back through bridge 15 into the receiving circuitry.

Beam 25 is considerably attenuated by its travel through pipe 11, particularly by its reflection from the surfaces; only a small portion of its energy is reflected from a flaw or anomaly; and a still smaller portion of that reflected energy eventually finds its way back to transducer 16. Therefore, a signal in the receiving circuitry representing flaw-reflected pulse may have an amplitude so low as to be commensurate with the amplitude of random noise spikes present in the receiver.

In order to enhance the amplitude of flaw-reflected pulses with respect to random noise, portions of the signal in the receiving system are delayed in time so that flaw-reflected pulses resulting from successive transmitted pulses are aligned in time, and then the delayed and undelayed portions of the signal are added. Flaw-reflected pulses, being time-aligned, add to produce a higher amplitude pulse, while randomly appearing noise does not add significantly, so that resulting higher amplitude flaw-reflected pulses may be distinguished from random noise.

Pipe 11 is rotated, by means not shown, about its axis at a constant angular velocity with respect to transducer 16. Its direction of rotation, as shown by the arrow in FIG. 1, is such that a flaw 10 moves through ultrasonic beam 25 toward transducer 16. The size of flaw 10 is greatly exaggerated for purposes of the drawing, and, while the flaw is shown here as located in outer pipe surface 13, the system is not restricted to use with a flaw in this or any other particular location; the flaw could equally well occur on inner surface 12 or between the two surfaces and within the pipe structure.

Since the pipe is rotating, and since the transmitted pulses are equally spaced, flaw 10 occupies a different position as each successive vibrational energy pulse is incident upon it. The solid line and two dotted line representations of flaw 10 in FIG. 1 represent, from right to left, its succesive positions when first, second and third succesive pulses, repsectively, are incident upon it. The flaw is shown in solid line as occupying a position just at the forward edge of the beam upon the incidence of the first pulse, occupying a position midway of the beam upon incidence of the second pulse, and occupying a position at the trailing edge of the beam upon incidence of the third pulse. Since the angular velocity of pipe rotation is constant, and the transmitted pulse spacing is equal, flaw 10 moves an equal distance between the occurrence of successive incident pulses shortening the reflection path length for succesive transmitted pulses by equal increments.

The appropriate signal delays are effected by the three parallel branches or channels into which the return electrical signal from transducer 16 is sent after amplification and detection. The first channel, uppermost on the figure, contains an amplifier $A_1$, and no delay circuit. The second channel contains a delay circuit 26 having a time delay $D_2$ and feeding an amplifier $A$. The third channel, the lowermost channel in FIG. 1, contains a delay circuit 27 having a delay of extent $D_3$ and leading into an amplifier $A_3$. The outputs of amplifiers $A_1$, $A_2$ and $A_3$ are connected to the three inputs of conventional summing circuit 18, having an output which is the sum of the amplitudes of the three input signals.

To understand the nature of the delays incorporated in this system and the operation of the three-channel delay network, it is helpful to consider the waveforms of the signals appearing at the outputs of amplifiers $A_1$, $A_2$, and $A_3$, and of summing circuit 18, for a particular time interval. We will choose that interval during which the reflected return from the third of the three previously mentioned pulses emerges from amplifier $A_1$, and, assuming negligible time delay in the summing circuit, also from summing circuit 18. Waveforms of the outputs of amplifiers $A_1$, $A_2$ and $A_3$ during this time interval are shown in the upper three lines of FIG. 2, and the corresponding output waveform from summing circuit 18 is shown on the bottom line of FIG. 2, with all of the waveforms being displayed on a common time axis. Vertical dashed lines, indicating common points in time, help to relate the four waveforms to each other. A portion of the beam energy is reflected from outer surface 13 as the pulse is transmitted from wedge 24 through that surface into pipe 11. This return takes the form of a pedestal which is the left-hand pedestal appearing in each of the waveforms, and is labeled "F.S.," for front surface. When the beam is subsequently reflected from the inner, or back, surface 12 a small amount of energy will likewise be reflected back to transducer 16, and this is represented by the center pedestal labeled "B.S." (back surface). When the pulse is incident again upon front, or outer surface 13, there will be another reflection, and another front surface (F.S.) pedestal, which is the right-hand pedestal in each of the waveforms. The reflection from the flaw itself appears upon the right-hand front surface pedestal.

Figure 2:
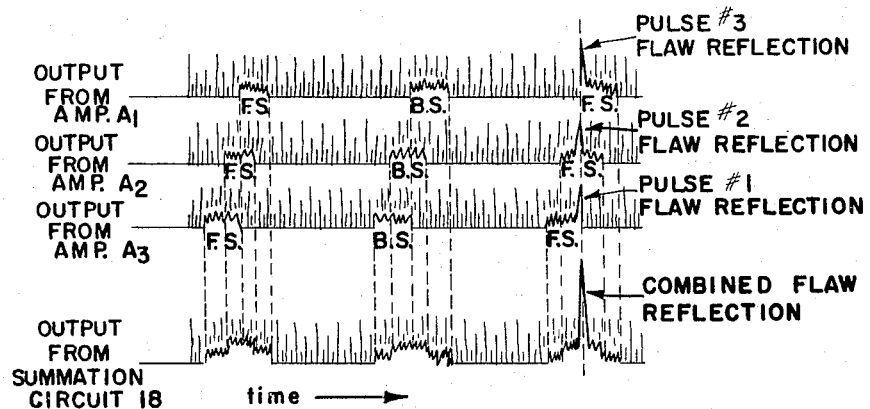
FIG. 2 is a graph showing the signal waveforms at various points in the system of FIG. 1.

The output of amplifier $A_1$ representing the undelayed return of pulse No. 3, is displayed as the upper waveform in FIG. 2. Reflected returns from previous pulses No. 2 and No. 1 are similar in configuration to the return from pulse No. 3, and their waveforms are shown in the second and third lines from the top, respectively, of FIG. 2. If flaw 10 were stationary with respect to transducer 16 so that the length of the reflected path from the transducer to the flaw and back were constant, then if delay $D_2$ were equal to the interval between successive transmitted pulses and $D_3$ were twice $D_2$, the flaw reflected returns from the three pulses would be time-aligned. Since flaw 10 is in motion, however, in such a fashion as to shorten the path length for reflections from it corresponding to each succeeding pulse, the time delays required to align flaw reflections in time are not equal to the time periods between successive transmitted pulses, but rather must be made equal to the periods between successive received pulses. Since the reflection path from flaw 10 is continually shortening, received flaw reflections are spaced more closely than the transmitted pulses. Since pipe 11 is rotating with a constant angular velocity, and the transmitted pulse repetition rate is constant, flaw 10 moves through an equal distance between successive incident pulses, and the time spacing between received pulses reflected from flaw 10 is equal. The spacing between received pulses may be calculated from the geometry of the particular testing situation and the speed of rotation of the pipe, or it may be obtained experimentally by observing reflected returns using a pipe having a known flaw.

Time delay $D_2$ incorporated in delay circuit 26 therefore has a duration equal to the interval between two received flaw-reflected pulses, and the output of amplifier $A_2$ is delayed by this amount and, as shown in the corresponding waveform in FIG. 2, the pulse representing the reflection of pulse No. 2 from the flaw is time-aligned with the pulse representing the reflection of transmitted pulse No. 3 from the flaw. Time delay $D_3$ incorporated in delay circuit 27 is twice the duration of delay $D_2$ of time delay circuit 26. The output waveform of amplifier $A_3$, therefore, as shown in FIG. 2, having been delayed for twice the interval between received pulses, is so positioned in time that the pulse representing the reflection from the flaw of transmitted pulse No. 1 is time-aligned with the similar pulse representations for transmitted pulses Nos. 2 and 3.

Note that while the flaw-reflected pulses in the output waveforms of the three channels are time-aligned, the front and back surface pedestals are not. This follows since the rotation of pipe 11 has no effect upon the path length of reflections from symmetrical pipe surfaces 12 and 13. Put in another way, if pipe 11 were stationary, then both flaw reflections and corresponding front and rear surface reflections for successive transmitted pulses would be spaced apart by a time interval equal to the interval between the transmitted pulses. The rotation of pipe 11, as we have seen, alters the reflected path length of pulses reflected from flaw 10, so that their spacing is decreased, but it does not alter the relationship of transmitted beam 25 to inner and outer surfaces 12 and 13, so that reflections from these surfaces are spaced as before. The incorporation of delays which result in time-alignment of the flaw returns therefore result in misalignment of the differently spaced surface returns.

All three waveforms at the outputs of the three branches or channels, contain random noise spikes as shown in FIG. 2, and these spikes rival in height the pulse representations of reflections from the flaw.

Summing circuit 18 adds the amplitudes of the three signal inputs at each instant of time. As displayed on the bottom waveform of FIG. 2, the output of summing circuit 18 contains a representation of flaw reflection having an amplitude which is the sum of the amplitudes of the flaw reflections of pulses 1, 2 and 3, since these pulses all pass through summing circuit 18 in perfect time alignment. Random noise spikes, on the other hand, do not add linearly since by their very nature they are not time-aligned, but are random in character. Therefore, the increased amplitude flaw reflection representation is much more easily distinguished from accompanying random noise at the output of the summing circuit, than it was in any of the three parallel channels. As may be seen by the output waveform of summing circuit 18, overlapping portions of the front and back surface pedestals also add.

The output of summing circuit 18 may be fed to any type of utilization or display unit; in the system of FIG. 1 this output is fed to one of the vertical plates of CRT 19 which may be provided, by means not shown, with a horizontal sweep synchronized with pulse generator 14, to provide a visual display similar to the output waveform of summing circuit 18.

Figure 3:
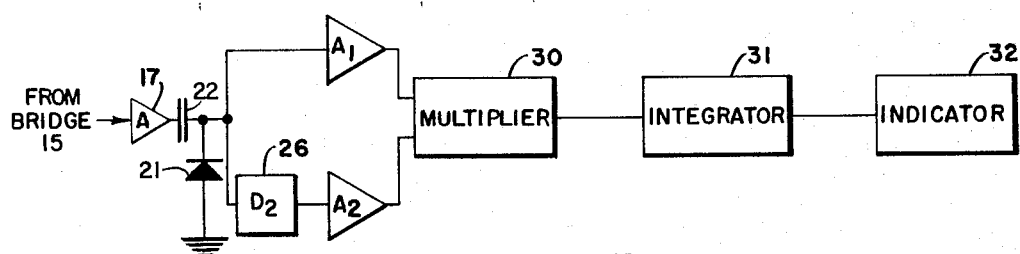
FIG. 3 is a partial block diagram of an alternative correlation system usable with the basic inspection system of FIG. 1 in lieu of the correlation system shown therein.

FIG. 3 shows another way of correlating reflected returns from successive pulses which may be used in the basic inspection system of FIG. 1 in place of the simple summing operation. The difference between the embodiment of FIG. 3 and that of FIG. 1 appears only in those circuits subsequent to detector 21. In FIG. 3, after the reflected returns are amplified and detected, they are sent through two parallel branches or channels corresponding identically to the first and second (or upper two) channels of FIG. 1. The outputs of amplifiers $A_1$ and $A_2$ in the FIG. 3 embodiment are identical to those of the corresponding amplifiers of FIG. 1, as shown in the upper two waveforms of FIG. 2.

Instead of adding the amplitudes of the outputs of the two channels, as was done in FIG. 1 with summing circuit 18, in the FIG. 3 embodiment these two outputs are correlated in the exact mathematical sense implied by that term as used in communication theory. That is, the correlation integral of the two output signals is obtained:

$$\frac{1}{2T}\int_{-T}^{T}f(t)g(t-\tau)dt$$

where $f(t)$ is the output of one of the channels, and $g(t-\tau)$ is the output of the other of the channels The time differential $\tau$ between the two signals is adjusted so that the correlation integral provides a measure of the match or fit of the two signals. The two flaw reflections, which are time-aligned, match quite well and provide a high output; the random noise pulses, which are not time-aligned, provide only a low level D.C. output.

The effectiveness of correlation techniques in distinguishing signals from random noise is well known, as are electronic circuits for accomplishing correlation of two input signals. The correlation process comprises point by point multiplication of the amplitudes of the two signals, followed by integration, and the process is normally effected electronically by means of a multiplier followed by an integrator. In FIG. 3 multiplier 30 receives the outputs of amplifiers $A_1$ and $A_2$. Multiplier 30 may be any conventional type of multiplier circuit well known in the art whose output has an instantaneous value comprising the product of the instantaneous amplitudes of the two input signals. Multiplier 30 is followed by an integrator 31, which is again a standard circuit and whose output provides an indication of its input signal integrated over a desired time interval. The interval of integration will of course be set in accordance with the repetition rate of the pulse generator 14 and other system parameters. The output of integrator 31 is fed to indicator 32, which may be a cathode ray tube, or any other suitable type of indicating device.

While the system of FIG. 3 utilizes only two channels, it obviously could comprise three channels as in the FIG. 1 system, with the outputs of all three channels being correlated in a similar manner. However, due to the high signal-to-noise discrimination obtained by taking the correlation integral, two channels will normally be sufficient.

Figure 4:
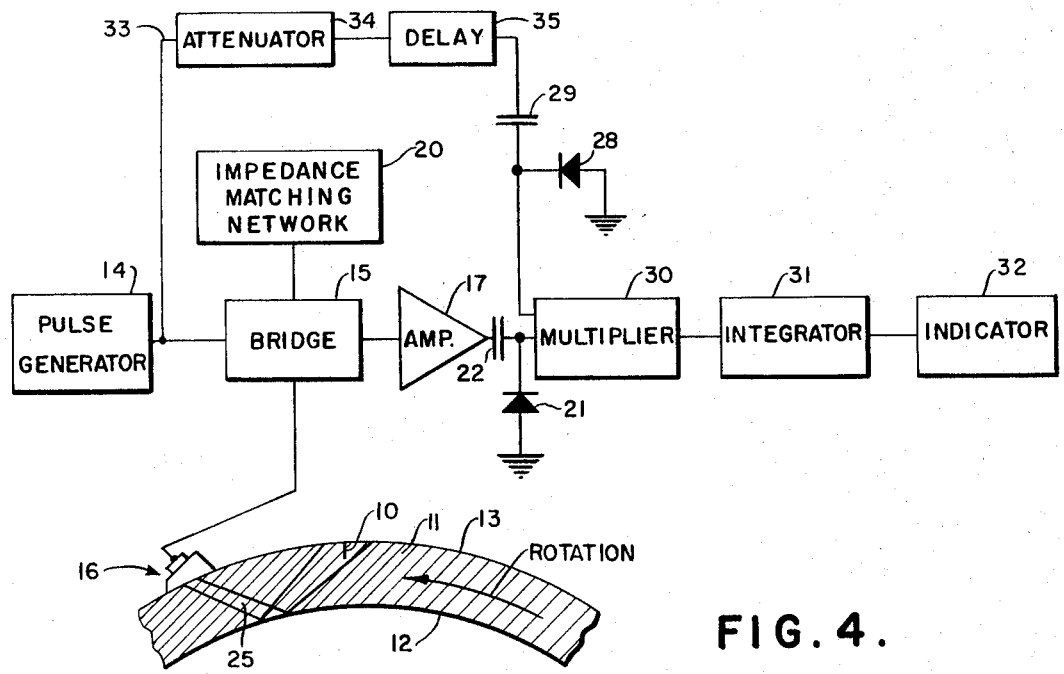
FIG. 4 shows, partially in block diagram and partially in section, another embodiment of an ultrasonic inspection system somewhat similar to that of FIG. 1, but in which reflected pulses are correlated with a sample of the transmitted pulses.

Turning now to FIG. 4, there is shown an ultrasonic inspection system utilizing a single transceiving transducer 16 and a correlation system similar to that shown in FIG. 3 for enhancing discrimination between the flaw-reflected pulse and random noise by obtaining the correlation integral, but in which, instead of delaying a portion of the received signal for purposes of correlation, a sample of the electrical energy from pulse generator 14 is tapped off, attenuated, and delayed for the appropriate interval, and then correlated with the reflected return.

The connection of pulse generator 14 through bridge 15 to transducer 16, and the relation of transducer 16 to rotating pipe 11 are identical to those shown in the systems of FIGS. 1 and 3. The flaw reflected signal received at transducer 16 is fed through bridge 15 and amplifier 17, is detected by diode 21, and is then fed to one of the inputs of multiplier 30. A portion of the output of pulse generator 14 is tapped off by line 33 and fed through attenuator 34 and delay circuit 35 to the other input of multiplier 30. The output of delay circuit 35 is detected by diode detector 28, which is connected with its anode to ground and with capacitor 29 providing D.C. isolation of its cathode from the output of delay circuit 35. Attenuator 34, of conventional construction, reduces the amplitude of the output of pulse generator 14 to a level commensurate with the flaw reflected signal at the output of amplifier 17, so that the two signals will be of roughly equal amplitudes at the input to multiplier 30. The delay introduced by conventional delay circuit 35 is sufficient to time-align each pulse output from pulse generator 14 with the flaw reflected echo of that pulse at the output of amplifier 17. The delay period, then, must correspond to the complete reflection path for a flaw 10 appearing at a particular point in transmitted beam 25 such as the midway point shown occupied by flaw 10 in FIG. 4. The shape of the electrical pulse at the output of pulse generator 14 may differ considerably from the shape of the electrical pulse at the output of amplifier 17 representing received, flaw-reflected, ultrasonic energy, and the effectiveness of this type of correlation may therefore not be quite as high as for the correlation shown in FIG. 3, where subsequent reflected pulses are being compared, which will have substantially identical configurations. However, even though identical configurations of pulses are not being correlated, the system will provide sufficient discrimination between the signal pulses and random noise. Multiplier 30, integrator 31, and indicator 32 are identical in structure and function to those of FIG. 3.

FIGS. 5, 6 and 7 show ultrasonic inspection systems in which separate transducers are used for the transmission and for the reception of the compressional wave energy. FIG. 5 shows a system for detecting a flaw 10 in a longitudinal weld 36 in a pipe 11. In this system, a transmitting transducer T and three receiving transducers R1, R2 and R3, all identical in structure to transducer 16 previously described, are appropriately arrayed upon the surface of pipe 11. The periodic electrical pulses from pulse generator 14 are fed to transducer T where they are converted to a beam of pulses of mechanical vibrations transmitted into pipe 11. The transmitted beam from transmitting transducer T interrogates a particular area of weld 36, and spaced receiving transducers R1, R2 and R3 are arranged to receive reflections from a flaw 10 appearing in the interrogated region of weld 36. The reflected paths 37 to receiving transducers R1 and R3 are equal in length and slightly longer than the reflected path 38 to centrally located receiving transducer R2. The output of receiving transducer R2 is fed through a delay circuit 39 of conventional construction to the input of amplifier $A_2$; and the outputs of receiving transducers R1 and R3 are fed, without delays, to the inputs of amplifiers $A_1$ and $A_3$. Delay circuit 39 delays the output of receiving transducer R2 sufficiently with respect to the outputs of receiving transducers R1 and R3 to compensate for the longer path lengths 37 to transducers R1 and R3, and provide time-alignment of flaw reflections of a particular transmitted pulse at the outputs of the three amplifiers.

The outputs of amplifiers $A_1$, $A_2$ and $A_3$, after detection by diode detectors 42, 43, and 44, respectively, are fed to the three inputs of summing circuit 18, and the output of summing circuit 18 is fed to the vertical plates of CRT 19. Capacitors 45, 46, and 47 provide D.C. isolation of the cathodes of the diode detectors from the outputs of amplifiers $A_1$, $A_2$, and $A_3$, respectively. The structure and function of amplifiers $A_1$, $A_2$, and $A_3$; of summing circuit 18; and of CRT 19 are identical to those of the system of FIG. 1. Summing circuit 18, as in the system of FIG. 1, provides an output in which the flaw-reflected signal is greatly increased in amplitude, while random spikes are not added linearly and therefore are not so increased, and the visual display on the face of CRT 19 accordingly permits easy identification of flaw echo returns.

The system of FIG. 5 is not restricted to use with there receiving transducers; the outputs of any number of receiving transducers, as long as there are two or more, may be summed in an analogous fashion. The reflected paths to the various receiving transducers may vary in any desired manner, the only requirement is that the appropriate delay or delays be inserted to provide time-alignment of flaw-reflected portions of a given transmitted pulse.

FIG. 6 shows an ultrasonic inspection system similar to that of FIG. 5, but using only two receiving transducers R1 and R2, and which the reflected pulses at the outputs of those transducers are correlated by obtaining the correlation integral rather than by the summation system of FIG. 5. Pulses from pulse generator 14 are transduced into mechanical vibrational energy by transmitting transducer T and the resultant beam from transmitting transducer T interrogates a region of weld 36. Reflections from a flaw 10 appearing in weld 36 are received at receiving transducers R1 and R2, with the reflected path to receiving transducer R2 being longer than the reflected path to receiving transducer R1. Delay circuit 39 in the output of receiving transducer R1 compensates for the longer reflected path to transducer R2 and provides time-alignment of reflected pulses from a single transmitted pulse. The output of delay circuit 39 is fed to the input of amplifier $A_1$. The output of receiving transducer R2 is fed directly to amplifier $A_2$. The outputs of the two amplifiers, with the flaw reflections time-aligned, are fed through capacitors 45 and 46 respectively, and detected by diodes 42 and 43 respectively, and then fed to the two inputs of multiplier 30. Multiplier 30 is followed by integrator 31 and indicator 32, all of the above components having identical structures and functions to those similarly designated in previous figures.

If receiving transducers R1 and R2 are so arranged that the paths of reflected energy from a flaw 10 to each of them are identical in length, no delay is required in their outputs. Also, obviously more than two receiving transducers could be used, with their outputs being appropriately delayed to provide time-alignment, and correlated in a similar manner. Here, however, as in the FIG. 3 embodiment, the high signal-to-noise advantage provided by obtaining the correlation integral makes the use of more than two channels probably unnecessary.

FIG. 7 shows an ultrasonic inspection system for detecting the existence of a flaw 10 in a weld 36 in pipe 11, in which pulses generated by pulse generator 14 are transduced by transmitting transducer T into mechanical vibrations and the resultant beam interrogates a particular region of weld 36. Reflected energy from a flaw 10 is received by a single receiving transducer R1, whose output is connected to input of amplifier 17. The output of amplifier 17 is detected and fed to one of the inputs of multiplier 30. A portion of the output of pulse generator 14 is fed through a conventional attenuator 34, whose function is to reduce the amplitude of the output pulses to a level commensurate with the amplitude of flaw-reflected pulses at the output of amplifier 17. The output of attenuator 34 is fed through delay circuit 35, detected, and fed to the other input of multiplier 30. Delay circuit 35 is identical in construction and function to delay circuit 35 of FIG. 4. It incorporates a delay, as in the FIG. 4 configuration, which is sufficient to delay the pulse at the output of pulse generator 14 a period of time equivalent to the time required for the same pulse to traverse the reflection path to a flaw 10 and then back to the receiving transducer and amplifier 17, in order to provide time-alignment of the two pulses at the input of multiplier 30. Note that here, as in the FIG. 4 system, since pipe 11 is continuously rotating, the length of the reflection path from flaw 10 is constantly changing and the fixed delay incorporated in delay circuit 35 effects time-alignment and permits flaw-indicating correlation for substantially only one instantaneous position of flaw 10. The nature and function of multiplier 30, integrator 31, and indicator 32 are identical to those of the FIG. 4 system.

The various detailed embodiments of this invention have been described in conjunction with the detection of flaws in a pipe rotating with a constant angular velocity so as to be continuously changing the length of the reflected path from a particular flaw 10. While such relative movement between the inspected object or part and the transducers is convenient in many practical inspection applications for permitting rapid scanning of a part such as a pipe, such relative motion is not necessary for the operation of any of the embodiments. This may be seen from a brief consideration of the effect of such relative motion, or the lack of it, on the various system configurations described herein.

In the systems of FIGS. 1 and 3, if there were substantially no relative motion between pipe 11 and transducer 16, the flaw-reflected path length would not change and flaw returns would arrive at the transducer spaced in an identical manner to the transmitted pulses. Delay $D_2$ would then be equal to the interval between successive transmitted pulses, and delay $D_3$ would be equal to twice that interval. ("Substantially no relative motion" means that the relative motion, if any, which exists, is not sufficiently rapid, or in such a direction, as to cause substantial changes in the length of the flaw-reflected path from pulse to pulse for purposes of the particular combining means used in the receiving channels.)

Operation of the systems of FIGS. 4 and 7 would be substantially improved if there were no relative motion between the inspected object and the transducer or transducers. As described herein, the constant time delay incorporated in delay circuit 35 permits flaw-indicating correlation for substantially only one position, corresponding to one path length, of flaw 10. With substantially no relative motion, flaw-indicating correlation would be obtained for a large number of successive reflected pulses.

In the systems of FIGS. 5 and 6, it is not the over-all reflected path length which is the important parameter, but rather the difference in the reflected path lengths for the various receiving transducers. In order for these systems to be effective, the differences in the lengths of flaw-reflected paths must remain substantially constant, so that the constant time delay incorporated in delay circuit 39 effects the desired time-alignment for the combining circuitry in the receiver. With pipe 11 rotating as shown, there will be some change in the path length differentials, but it is assumed that for a certain portion of the movement of flaw 10, these differentials will remain substantially constant from pulse to pulse so that the constant delays will result in appropriate time-alignment. If pipe 11 were completely or substantially stationary with respect to the transducers, of course, this problem would be completely removed as the path length differentials would remain constant at all times.

While this invention has been described with reference to numerous specific systems embodying it, it is understood that the invention is not restricted to those specific systems, and that various alterations and modifications as will occur to those skilled in the art are encompassed within the scope of the invention, which is defined solely in the appended claims.

What is claimed is:

1. A method of detecting discontinuities in a region by ultrasonic vibrational energy, comprising the steps of
transmitting from a source a periodic series of pulses of ultrasonic vibrational energy into the region;
moving the region with respect to said source;
receiving and converting into an output representation a series of vibrational energy output pulses following the traversing of at least a portion of said region, there being an output pulse for each encountered region boundary for each transmitted pulse,
said output pulses being modified by discontinuities encountered such that modifications of corresponding output pulses for different transmitted pulses occupy different positions in said output pulses,
said output representation also unavoidably including random noise;
delaying a portion of said output representation the length of time equal to the time between two output pulses; and
combining said output representation and said delayed portion thereof to increase the strength of discontinuity-modified pulses with respect to unmodified output pulses and random noise.

2. The method of claim 1 wherein said combining of said representation and said delayed portion thereof comprises summing the amplitudes of said representation and said delayed portion thereof.

3. The method of claim 1 wherein said combining of said representation and said delayed portion thereof comprises obtaining the correlation integral of said representation and said delayed portion thereof.

4. A reflection method of detecting anomalies in a region by ultrasonic vibrational energy comprising the steps of:
transmitting from a source a periodic series of pulses of ultrasonic vibrational energy into the region;
moving the region with respect to said source;
receiving and converting into an output representation a series of vibrational energy output pulses reflected from the region, there being an output pulse for each encountered region boundary for each transmitted pulse, said output pulses being modified by anomalies encountered such that modifications of corresponding output pulses for different transmitted pulses occupy different positions in said output pulses,
said output representation also unavoidably including random noise;
delaying a portion of said output representation the length of time equal to an integral number times the interval between successive received anomaly-modified, reflected pulses; and
combining said output representation and said delayed portion thereof to increase the strength of anomaly-modified, reflected pulses with respect to unmodified output pulses and random noise.

5. The method of claim 4 wherein said combining of said representation and said delayed portion thereof comprises summing the amplitudes of said representation and said delayed portion thereof.

6. The method of claim 4 wherein said combining of said representation and said delayed portion thereof comprises obtaining the correlation integral of said representation and said delayed portion thereof.

7. A reflection method of detecting anomalies in a region by ultrasonic vibrational energy, comprising the steps of
transmitting from a source a periodic series of pulses of ultrasonic vibrational energy into the region;
moving the region with respect to said source;
receiving and converting into an output representation a series of at least three vibrational energy output pulses reflected from the region, there being an output pulse for each encountered region boundary for each transmitted pulse,
said output pulses being modified by anomalies encountered such that modifications of corresponding output pulses for different transmitted pulses occupy different positions in said output pulses,
said output representation also unavoidably including random noise;

dividing said representation into first, second and third portions;

delaying said second portion with respect to said first portion the length of time equal to the time between a first series of output pulses corresponding to a first transmitted pulse and a second series of output pulses corresponding to a second transmitted pulse;

delaying said third portion with respect to said first portion the length of time equal to the time between said first series of output pulses and a third series of output pulses corresponding to a third transmitted pulse; and combining said first, second and third portions to increase the strength of anomaly-modified pulses with respect to unmodified output pulses and random noise.

8. The method of claim 7 wherein said combining of said first, second, and third portions comprises summing the amplitudes of said first, second, and third portions.

9. The method in accordance with claim 1 wherein the region is moving toward said transmitting source.

10. The method in accordance with claim 7, wherein the region is curvilinear and is moving toward said transmitting source such that the time between said first and third series of output pulses is other than twice the time between said first and second series of output pulses.

11. A system for detecting flaws in a pipe rotating about its longitudinal axis with substantially constant angular velocity, comprising in combination:

means for transmitting a periodic series of pulses of ultrasonic vibrational energy into said pipe in a beam having a substantial circumferentially directed component;

means for receiving and converting into an output representation vibrational energy reflected from a flaw in said pipe,
the time intervals between successive received, flaw-reflected energy pulses being equal and different from the time interval between successive transmitted pulses, means to amplify said representation,
said amplifying means unavoidably introducing random noise into said representation;

first and second parallel channels;

means to divide said representation into first and second portions and introduce said portions into said first and second channels, respectively;

delay means in said second channel to delay said second portion for a time period equal to the time interval between successive received, flaw-reflected energy pulses;

means at the outputs of said first and second channels to combine said first and second portions emerging therefrom to increase the strength of flaw-reflected representations with respect to random noise.

12. The system of claim 11 wherein:
said means to combine comprises a summing circuit having two inputs and an output and adapted to supply an output signal which comprises the sum of the amplitudes of the signals at said two inputs at corresponding points in time,
one of said inputs being connected to the output of said first channel and the other of said inputs being connected to the output of said second channel.

13. The system of claim 11 wherein:
said means to combine comprises means for obtaining the correlation integral of the outputs of said first and second channels.

References Cited by the Examiner

UNITED STATES PATENTS

| | | | |
|---|---|---|---|
| 2,646,555 | 7/1953 | Straehl | 73—67.9 X |
| 2,677,128 | 4/1954 | Spaulding et al. | 343—17.1 |
| 2,688,124 | 8/1954 | Doty et al. | |
| 2,769,158 | 10/1956 | Schultz | 73—67.7 |
| 2,803,129 | 8/1957 | Bradfield | 73—67.8 |
| 3,158,830 | 11/1964 | Clay. | |

OTHER REFERENCES

Raemer, H. R., et al., Correlation Devices To Detect Weak Signals. Electronics. May 22, 1959, pp. 58–60.

RICHARD C. QUEISSER, *Primary Examiner.*

JOHN P. BEAUCHAMP, *Assistant Examiner.*